United States Patent [19]

Matthews et al.

[11] 4,239,862
[45] Dec. 16, 1980

[54] THERMOPLASTIC ELASTOMER CONTAINING LONG CHAIN ALIPHATIC ALCOHOL

[75] Inventors: Demetreos N. Matthews, Bethany; Walter Nudenberg; Henno A. Petersen, both of Newtown, all of Conn.

[73] Assignee: Uniroyal, Inc., New York, N.Y.

[21] Appl. No.: 103,307

[22] Filed: Dec. 13, 1979

[51] Int. Cl.$^3$ ............................................. C08L 23/16
[52] U.S. Cl. .................................... 525/240; 525/1; 260/33.4 PQ; 260/33.6 AQ; 260/33.6 PQ
[58] Field of Search .................................. 525/240, 1; 260/33.4 PQ

[56] References Cited

U.S. PATENT DOCUMENTS

| | | | |
|---|---|---|---|
| 3,517,086 | 6/1970 | Shirayama et al. | 525/240 |
| 3,806,558 | 4/1974 | Fischer | 525/240 |
| 3,862,106 | 1/1975 | Fischer | 525/240 |

Primary Examiner—Carman J. Seccuro
Attorney, Agent, or Firm—James J. Long

[57] ABSTRACT

Long chain aliphatic alcohol ($C_{16}+$) is added to thermoplastic elastomer based on blend of olefin copolymer rubber (EPM or EPDM) and polyolefin resin (especially polypropylene). The blend may be uncured or dynamically partially cured. The long chain aliphatic alcohol permits injection molded articles to be demolded within a shorter time without tearing or distortion, and decreases the surface tackiness of the article.

10 Claims, No Drawings

THERMOPLASTIC ELASTOMER CONTAINING LONG CHAIN ALIPHATIC ALCOHOL

The present invention concerns thermoplastic elastomeric compositions. These are materials which can be processed and fabricated by methods used for thermoplastics and do not require any cure in the shaped state to exhibit the elastomeric properties of vulcanized rubbers.

Thermoplastic elastomers based on blends of saturated or unsaturated monoolefin copolymer rubber (EPM or EPDM rubber) with crystalline polyolefin resin are described, for example, in U.S. Pat. No. 3,806,558, Fischer, Apr. 23, 1974. Such materials are sometimes referred to as "TPO's".

A problem with conventional TPO's is that the softer forms of these materials (i.e., those having Shore A hardness values of 65 or less) have a tendency to require longer cycle times than desirable in injection molding. They also exhibit a tendency to tear or deform on removal from the injection mold and a tendency toward surface tackiness.

We have found, surprisingly, that the addition of long-chain aliphatic alcohols ($C_{16}$ and up) to TPO's mitigates the foregoing problems. This is particularly unexpected since the use of these alcohols with block copolymer types of thermoplastic elastomers based on styrene and butadiene does not consistently yield similar advantages.

The invention is accordingly directed to a thermoplastic elastomer comprising a blend of:

(A) a monoolefin copolymer rubber which is a copolymer of ethylene and an alpha-monoolefin of the formula $CH_2=CHR$ where R is an alkyl radical having 1 to 12 carbon atoms, and optionally a copolymerizable diene termonomer;

(B) a crystalline polyolefin resin;

(C) a long-chain aliphatic alcohol having at least 16 carbon atoms;

(D) optionally an amorphous non-elastomeric polypropylene homopolymer or amorphous non-elastomeric copolymer of propylene with another monoolefin; and (E) optionally an extender oil;

the said ingredients (A), (B), (C), (D) and (E) being present in the following proportions, expressed as percent by weight based on the total weight of (A), (B), (C), (D) and (E):

from 15 to 80% of (A),
from 15 to 80% of (B),
from 3 to 40% of (C),
from 0 to 45% of (D), and
from 0 to 40% of (E).

In a preferred practice of the invention the blend contains 5-25% of the alcohol (C). Particularly preferred is such a blend wherein the quantity of alcohol (C) plus extender oil (E) is 8-60%.

The blend may further include various conventional additional ingredients such as a crystallization initiator for polypropylene resin, antioxidants, etc.

The TPO employed may be of the uncured kind, or it may be of the partially cured type (see U.S. Pat. No. 3,806,558 referred to above) in which case the composition will further include a suitable amount of an appropriate curative to effect the desired semi-cure, preferably in a dynamic curing step. If a dynamic partial curing step is utilized it may be carried out on the monoolefin copolymer rubber component (A) alone before blending with the other components, or the dynamic curing step may be carried out after mixing the monoolefin copolymer rubber component with some or all of the other components.

The monoolefin copolymer rubber (A) employed in the blend of the invention is an amorphous, random, elastomeric copolymer of two or more monoolefins, with or without a copolymerizable polyene. Usually two monoolefins are used, but three or more may be used. Ordinarily one of the monoolefins is ethylene while the other is preferably propylene. However, other alpha-monoolefins may be used including those of the formula $CH_2=CHR$ where R is an alkyl radical having for example one to 12 carbon atoms (e.g., butene-1, pentene-1, hexene-1, 4-methylpentene-1, 5-methylhexene-1, 4-ethylhexene-1, etc.) While the monoolefin copolymer rubber may be a saturated material, as in ethylene-propylene binary copolymer rubber ("EPM"), it is ordinarily preferred to include in the copolymer a small amount of at least one copolymerizable polyene to confer unsaturation on the copolymer ("EPDM"). Although conjugated dienes such as butadiene or isoprene may be used for this purpose, in practice it is usual to employ a non-conjugated diene, including the open-chain non-conjugated diolefins such as 1,4-hexadiene or a cyclic diene, especially a bridged ring cyclic diene, as in dicyclopentadiene, or an alkylidenenorbornene as in methylenenorbornene or ethylidenenorbornene, as well as cyclooctadiene, methyltetrahydroindene, etc. The polyenes employed are not limited to those having only two double bonds, but include those having three or more double bonds. Typically, conventional monoolefin copolymer rubber has a Brookfield viscosity in excess of 5,000,000 at 375° F. or a Mooney viscosity of at least 20 ML-4 at 212° F.

The crystalline polyolefin resin (B) used to make the blend of the invention is a solid, high molecular weight resinous plastic material made by polymerizing such olefins as ethylene, propylene, butene-1, pentene-1, 4-methylpentene, etc., in conventional manner. Thus, such crystalline polyolefins as polyethylene (either of the low density e.g., 0.910–0.925 g/cc, medium density e.g., 926–0.940 g/cc or high density e.g. 0.941–0.965 type) may be used, whether prepared by high pressure processes or low pressure processes, including linear polyethylene. Polypropylene is a preferred polyolefin plastic, having highly crystalline isotactic and syndiotactic forms. Frequently the density of polypropylene is from 0.800 to 0.980 g/cc. Largely isotactic polypropylene having a density of from 0.900 to 0.910 g/cc may be mentioned particularly. Crystalline block copolymers of ethylene and propylene (which are plastics distinguished from amorphous, random ethylene-propylene elastomers) can also be used. Included among the polyolefin resins are the higher alpha-olefin modified polyethylenes and polypropylenes.

The aliphatic alcohols (C) used as additives in this invention are those with sixteen or more carbon atoms. The $C_{30}$ to $C_{40}$ alcohols are preferred. Non-limiting examples of usable alcohols are: cetyl, stearyl, 1-nonadecanol, 1-eicosanol (arachidyl alcohol), 1-docosanol, 1-tetracosanol, ceryl alcohol, montanyl alcohol, myricyl alcohol, melissyl alcohol, and lacceryl alcohol. The trade names of some of the alcohols of interest and the products from which they are derived are listed in Table I.

TABLE I

COMMERCIAL ALIPHATIC ALCOHOLS

| NAME | TRADE-MARK* | DERIVED FROM | $C_{16}$ | $C_{18}$ | $C_{20}$ | $C_{22}$ | $C_{24}$ | $C_{26}$ |
|---|---|---|---|---|---|---|---|---|
| Hexadecanol | CO-1695 | coconut | 96 | 3 | | | | |
| Hexadecanol-Octadecanol | TA-1618 | tallow | 28 | 67 | 1 | | | |
| Octadecanol | ALFOL-1618 | ethylene | 61 | 37 | 2 | | | |
| | CO-1895 | coconut | 2 | 97 | 1 | | | |
| | DEHYDAG HD | natural oils | 4 | 94 | 2 | | | |
| Eicosanol, Docosanol, Tetracosanol | EPAL 20+ | ethylene | | 4 | 20 | 13 | 10 | 19 |
| Eicosanol Docosanol | ALFOL-20+ and 22+ CONOCO | ethylene | | | 49 | 29 | 12 | 8 |
| Hexadecanol, Octadecanol | EPAL 1618 | ethylene | 45 | 49 | 2 | | | |

*EPAL trademark Ethyl Corporation.
CO- trademark Proctor & Gamble.
TA- trademark Proctor & Gamble.
ALFOL trademark Continental Oil Company.
DEHYDAG trademark Henkel Co.

Even higher molecular weight alcohols are preferred. Higher boiling fractions or residues which have been stripped at higher temperatures are preferred since the lower molecular weight alcohols have a tendency to "bleed" on standing after incorporation.

The long-chain aliphatic alcohol employed may be a monoalcohol or a polyol (e.g., olefin oxides and diols derived from them).

Optional component (D), the amorphous polypropylene, may be defined as an amorphous, non-elastomeric polypropylene homopolymer or amorphous, non-elastomeric copolymer of propylene with another monoolefin (e.g., ethylene), and is characterized by low degree of isotactic or syndiotactic blocks of said propylene or alpha-olefin copolymer. Unlike crystalline polyolefins such as crystalline polypropylene, such amorphous polymers or copolymers are generally soluble below 50° C. with most aliphatic, aromatic, and halogenated hydrocarbons.

Whereas largely isotactic crystalline polypropylene has a density of from 0.900 to 0.910 g/cc, amorphous polypropylene has a density below 0.900 g/cc, usually within a range 0.82 to 0.88 g/cc.

Amorphous polypropylene is generally obtained as a byproduct in the production of crystalline isotactic polypropylene. Whereas crystalline isotactic polypropylene is not soluble excpet at high temperatures (above about 120° C.) in any organic solvents, the amorphous polypropylene will dissolve.

Amorphous polypropylene is usually obtained by extracting the mixture of crystalline isotactic polypropylene and amorphous polypropylene produced by typical polymerization catalysts with an appropriate solvent. The amorphous polypropylene is that fraction which is soluble in the extraction solvent.

The optional component (E), the extender oil, may be any conventional extender oil or process oil, whether derived from petroleum, obtained from other natural sources, or manufactured synthetically. Conventional extender oils or softeners are classified into solvents, partial solvents, and non-solvents. Important extender oils include the paraffinic, naphthenic and aromatic type substantially non-volatile, compatible, hydrocarbon mineral oils. Naphthenic and paraffinic extenders are preferred.

It is desirable that the composition contain a crystallization initiator or nucleating agent for polypropylene. Any heterogeneous foreign material will aid crystallization to a greater or lesser extent. Non-limiting examples of such materials are titanium phosphate, glass powder, aluminum inorganics, benzoic acids and their aluminum or sodium salts, dibasic or monobasic acid salts, alicyclic acid salts, benzylidene sorbitol, etc.

If a dynamic curing step is carried out, suitable curing agents and curing conditions are as described in U.S. Pat. No. 3,806,558 referred to above (including col. 3, line 21 to col. 4, line 24 and col. 5, line 25 to col. 6, line 51). Briefly, such curatives include any conventional curing or vulcanizing agents effective in the monoolefin copolymer rubber (A), especially peroxides, with or without sulfur or other co-curing agents or activators. It will be understood that the thus dynamically semi-cured blend remains a thermoplastic material that can be reprocessed repeatedly, but it has elastomeric properties without requiring further cure. Without desiring to be limited to any particular theory of operation, it appears that the shearing imparted during the dynamic cure (cure while masticating or working) may break down a certain amount of the crosslinkages, so that the material remains thermoplastic in spite of the curing reaction. For this purpose any conventional curative including radiation may generally be employed. Examples of conventional curatives include such free-radical generating agents or cross-linking agents as the peroxides, whether aromatic or aliphatic. The peroxide curative may be used alone, or in conjunction with the usual auxiliary substances such as sulfur, maleimides including bis-maleimides, poly-unsaturated compounds (e.g., cyanurate), acrylic esters (e.g., trimethylolpropane trimethacrylate), etc. With sulfur curatives, such as sulfur itself or sulfur donors, it is usually desirable to include an accelerator of sulfur vulcanization as well as an activator (e.g., a metal salt or oxide), as in conventional practice. Mixed peroxide-type or mixed sulfur-type curing systems may be employed if desired such as dicumylperoxide plus 2,5-bis(tert-butylperoxy)-2,5-dimethylhexane or sulfur plus tetramethylthiuram disulfide. The preferred monoolefin copolymers having residual unsaturation, conferred by the presence of a polyene, such as EPDM, afford the widest choice of curatives.

Usually the following procedure is applied in carrying out the invention:

1. The monoolefin copolymer elastomer, the polyalphaolefin plastic and the long-chained aliphatic alcohol are charged at the desired ratios to a suitable mixer such as a Banbury internal mixer, a transfer type extruder mixer, or any device that will enable efficient mastication at the desired temperature. Optionally, one can add any or all of the following to the mix in the desired proportions: the amorphous polypropylene or amorphous non-rubbery propylene alpha-olefin copolymer, the oil, a crystallization initiator, a filler, and a curing agent.

2. While mixing, the temperature is increased to above the decomposition temperature of the curing agent, if used, and usually the mix is held at such a temperature, while continuing the mixing, for a time period long enough to ensure at least 95% decomposition of the curing agent, based on its theoretical half life at said temperature, and thorough mixing of the blend.

If no curing agent is used, the mix is simply worked at a temperature sufficiently elevated to soften the ingredients and mix them intimately.

3. After having processed the blend to a degree described under (2), an antioxidant is ordinarily added to the blend and processing is continued usually for one minute or more in order to thoroughly incorporate the antioxidant in the blend for the purpose of deactivating any residual curing agent and enhancing protection against oxidative degradation of the composition.

4. If so desired the resultant product may be refined on a mill before being used to form articles by means of extrusion, injection molding, press molding or other suitable means of manufacture.

The composition may further include other conventional compounding ingredients such as particulate or fibrous fillers (non-limiting examples are calcium carbonate, carbon black, silica, glass, asbestos, clay, talc), pigments, processing aids or lubricants, mold release agents, U.V. screening agents, antioxidants or stabilizers for the rubber or resin or both, etc. Any conventional antioxidant or stabilizer may be used, including by way of non-limiting example, amine types, phenolic types, sulfides, phenyl alkanes, phosphites, etc. Included are such materials as 1,2-dihydro-2,2,4-trimethylquinoline, diphenylamine acetone condensate, aldol-alphanaphthylamine, octylated diphenylamine, N-phenyl-N'-cyclohexyl-p-phenylenediamine, 2,6-di-tert-butyl-4-methylphenol, styrene-resorcinol resin, o-cresol-monosulfide, di-p-cresol-2-propane, 2,5-di(tert-amyl)hydroquinone, dilauryl-3,3'-thiodipropionate and similar dialkyl thiodipropionates, etc.

The form of the invention involving a dynamic semi-curing step is particularly advantageous from the standpoint of providing better melt flow, improved high temperature physicals and better die swell. A preferred elastomer for use in the invention is the low unsaturation type of EPDM terpolymer, containing such non-conjugated dienes as 1,4-hexadiene, dicyclopentadiene or 5-ethylidene-2-norbornene. Preferred curatives for these are the peroxide, sulfur or azide types. It will be understood that in the dynamic partial curing step the action of the curative is substantially exhausted so that there is little or no tendency for further cure to take place subsequently, and therefore the material is repeatedly reprocessable (i.e., truly thermoplastic and capable of being remolded repeatedly).

The following examples, in which all quantities are expressed by weight unless otherwise indicated, will serve to illustrate the practice of the invention in more detail.

EXAMPLE 1

This example illustrates partially cured thermoplastic elastomers of the invention. Table II shows a series of blends, identified by the letters a through g, containing the ingredients shown, in the amounts indicated, mixed following the general procedure described above. All ingredients except the stabilizer are masticated in an internal mixer for about 10 minutes at above 370° F. to effect the desired semi-cure, after which the stabilizer is added and mixed in briefly. The ingredients are identified as follows:

EPDM I is an elastomeric terpolymer of ethylene-propylene (75/25 ratio) and dicyclopentadiene (iodine number 5), Mooney viscosity 55 ML-4 at 257° F.

Crystalline PP is crystalline polypropylene plastic having a melt flow index of 11.0. (ASTM D123-58t, 230° C.).

Amorphous PP is amorphous polypropylene resin having a ring and ball softening point of 305° F. and a viscosity of 1,000–3,000 cps.

Alcohol I is "EPAL 20+" (trademark of Ethyl Corp.), $C_{20}$-$C_{32}$+linear primary alcohols with about 34% olefin ($C_{24}$ to $C_{40}$), hydroxyl number 105.

Alcohol II is "EPAL 1618" (trademark of Ethyl Corp.), linear primary alcohols concentrated at $C_{16}$ to $C_{18}$.

Olefin I is "Olefin 18+" (trademark of Ethyl Corp.), linear $C_{18}$-$C_{34}$ olefins (90%), alcohols (8%), paraffin (2%).

Paraffinic oil is mixed paraffinic and naphthenic petroleum hydrocarbon processing oil, sp. gr. 0.8762 at 60° F., flash point 450° F., molecular weight 550.

Curative is about 40% alpha, alpha'-bis(t-butylperoxy)diisopropylbenzene on clay.

Stabilizer may be dilaurylthiodipropionate or "Irganox 1010" (trademark, Geigy Chemical Co.) phenolic antioxidant.

Olefin II is "Gulftene 24-28" (trademark Gulf Oil Co.), mixed $C_{22}$-$C_{30+}$ alpha-olefins, sp. gr. 0.819 at 60° F., melting point 145° F., flash point 380° F.

"Feel" in Table II indicates the surface feel of samples of the blends that have been injection molded. Runs b c and f, which contain a long chain alcohol additive (C), represent the practice of the invention and give a dry, non-tacky feel. Run a, which is a control containing no additive and is outside the invention, gives an objectionable tacky feel. Runs d, e and g which are outside the invention, contain a long chain olefin additive and result in a tacky feel.

Physical properties are measured on 4×5×0.065 inch test slabs injection molded in a laboratory injection molding machine. Tests are carried out according to ASTM conventional methods. For example Shore A hardness is measured according to ASTM D-2240-68 while modulus, tensile and percent elongation at break are measured according to ASTM D412-68.

TABLE II

EFFECT OF LONG-CHAIN HYDROCARBON ALCOHOLS OR OLEFINS ON SURFACE TACK IN TPO

| Run: | a | b | c | d | e | f | g |
|---|---|---|---|---|---|---|---|
| EPDM I | 72 | 72 | 72 | 72 | 72 | 72 | 72 |
| Crystalline PP | 18 | 18 | 18 | 18 | 18 | 18 | 18 |

TABLE II-continued
EFFECT OF LONG-CHAIN HYDROCARBON ALCOHOLS OR OLEFINS ON SURFACE TACK IN TPO

| Run: | a | b | c | d | e | f | g |
|---|---|---|---|---|---|---|---|
| Amorphous PP | 10 | 10 | 10 | 10 | 10 | 10 | 10 |
| Alcohol I |  | 10 |  |  |  | 20 |  |
| Alcohol II |  |  | 10 |  |  |  |  |
| Olefin I |  |  |  | 10 |  |  |  |
| Paraffinic Oil | 20 | 10 | 10 | 10 | 10 | 10 | 10 |
| Curative | 0.2 | 0.2 | 0.2 | 0.2 | 0.2 | 0.2 | 0.2 |
| Stabilizer | 0.5 | 0.5 | 0.5 | 0.5 | 0.5 | 0.5 | 0.5 |
| Olefin II |  |  |  |  | 10 |  | 20 |
| PHYSICAL PROPERTIES: | | | | | | | |
| Hardness, Shore A | 71 | 73 | 71 | 64 | 73 | 81 | 70 |
| Tensile, psi | 1370 | 1310 | 1380 | 1220 | 1380 | 1330 | 970 |
| Elongation, % | 800 | 780 | 810 | 820 | 780 | 850 | 810 |
| 100% Modulus, psi | 370 | 360 | 350 | 330 | 420 | 390 | 320 |
| 200% Modulus, psi | 440 | 420 | 410 | 370 | 420 | 390 | 320 |
| Elongation Set, % | 350 | 370 | 390 | 320 | 360 | 360 | 350 |
| Feel | Slightly Tacky | Dry | Dry | Tacky | Tacky | Dry | Very Tacky |

EXAMPLE 2

Table III summarizes further blends, identified as h through m, based on the same polymers as in Example I. Runs h, k and m are semicured as in Example I while runs i, j and l are uncured. Alcohol III used in run i is "Alfol 204" (trademark Continental Oil Co.) composed of $C_{20}$–$C_{28}$ alcohols. Run h uses erucyl amide ("Adogen 58", trademark Ashland Chemical Co.) as a processing aid. Runs i, j, k and l include long chain alcohols and represent the practice of the invention (runs j and k further include sodium benzoate as a crystallization initiator for the polypropylene). It will be observed that they result in a product with a dry, non-tacky surface (injection molded). Run h, which is outside the invention, demonstrates that the amide processing aid has a deleterious effect. Run m, which is also outside the invention, shows that using paraffin oil without the long chain alcohol gives rise to a tacky material.

TABLE III
EFFECT OF LONG-CHAIN HYDROCARBON ALCOHOLS ON SURFACE TACK IN TPO

| Run: | h | i | j | k | l | m |
|---|---|---|---|---|---|---|
| EPDM I | 72 | 72 | 72 | 72 | 72 | 82 |
| Crystalline PP | 18 | 18 | 18 | 18 | 18 | 18 |
| Amorphous PP | 10 | 10 | 10 | 10 | 10 | — |
| Paraffin Oil | — | — | — | — | — | 20 |
| Alcohol I | 20 | — | 20 | 20 | 20 | — |
| Alcohol III | — | 20 | — | — | — | — |
| Curative | 0.2 | — | — | 0.2 | — | 0.5 |
| Sodium Benzoate | — | — | 0.5 | 0.5 | — | — |
| Stabilizer | 0.5 | — | — | — | — | 0.75 |
| Processing Aid | 0.5 | — | — | — | — | — |
| PHYSICAL PROPERTIES: | | | | | | |
| Hardness, Shore A | 64 | 76 | 73 | 76 | 78 | 71 |
| Tensile, psi | 1140 | 1410 | 1510 | 1260 | 1220 | 1950 |
| 100% Modulus, psi | 320 | 460 | 430 | 410 | 410 | 430 |
| 200% Modulus, psi | 370 | 680 | 490 | 460 | 410 | 550 |
| Elongation, % | 760 | 700 | 730 | 710 | 710 | 630 |
| Elongation Set, % | 350 | 390 | 375 | 350 | 370 | 230 |
| Feel | Very Tacky | Dry | Dry | Dry | Dry | Slightly Tacky |

EXAMPLE 3

Table IV shows the effect of long chain alcohol on injection molding cycle times of soft thermoplastic elastomer compositions. The TPO used in runs n, o, p and q in Table IV is a soft thermoplastic elastomer consisting of a terpolymer of ethylene-propylene-dicyclopentadiene, polypropylene and paraffinic oil, partially cured as described above. To evaluate the materials, the minimum injection molding cycle time is recorded for automatic sprue ejection or for manual removal of the sample without tearing. This time is measured from the point at which mold filling occurs to the point where the part can be removed from the machine without tearing,—either automatically or manually. The automatic sprue ejection time is considered more relevant for commercial operation. Run n containing no long chain alcohol is a control run outside the invention. Runs o, p and q containing the long chain alcohol represent the practice of the invention and give reduced sprue ejection time and manual removal time without tearing, as well as a dry non-tacky surface.

TABLE IV
EFFECT OF LONG CHAIN ALCOHOL ON SOFT THERMOPLASTIC ELASTOMER

| Run: | n | o | p | q |
|---|---|---|---|---|
| TPO | 135 | 135 | 135 | 140 |
| Alcohol I | 0 | 5 | 10 | 20 |
| Minimum Cycle Time in Sec. | | | | |
| Sprue Ejection | 100 | 90 | 60 | 60 |
| Manual Removal | 25 | 20 | 15 | 15 |
| Physical Properties | | | | |
| Hardness, Shore A | 60 | 64 | 62 | 61 |
| Tensile, psi | 450 | 430 | 440 | 390 |
| 100% Modulus, psi | 420 | 430 | 390 | 390 |
| Elongation, % | 115 | 110 | 130 | 120 |
| Feel | Slightly Tacky | Dry | Dry | Dry |

EXAMPLE 4

Table V shows the beneficial results of using both long chain alcohol and a crystallization initiator (sodium benzoate) on the sprue ejection times and on the feel of the molded piece. In Table V, EPDM II is a rubbery terpolymer of ethylene/propylene (52/48 ratio) and dicyclopentadiene (iodine number 10), Mooney viscosity 60 ML-4 at 257° F. Run y in Table V, which contains no long chain alcohol, is outside the invention and is included merely for purposes of comparison. Polybutene oil is a modifier for thermoplastic elastomers (trademark "Amopol", Amoco Chemicals Corp.) consisting predominantly of high molecular weight mono-olefins, the balance being isoparaffins. A typical Amopol has a kinematic viscosity at 100° F. of 30 cs., a specific gravity of 0.84 and a flash point of 280° F.

TABLE V
EFFECT OF LONG CHAIN ALCOHOL AND SODIUM BENZOATE ON TPO

| Run: | s | t | u | v | w | x | y |
|---|---|---|---|---|---|---|---|
| EPDM I | 40 | 40 | 40 | 40 | 40 | 40 | 40 |
| EPDM II | 40 | 40 | 40 | 40 | 40 | 40 | 40 |
| Crystalline PP | 20 | 20 | 20 | 20 | 20 | 20 | 20 |
| Curative | 1 | 1 | 1 | 1 | 1 | 1 | 1 |
| Alcohol I | 5 | 10 | 20 | 5 | 10 | 20 | — |
| Polybutene Oil | 12 | 9 | 4 | 12 | 9 | 4 | 15 |
| Sodium | | | | | | | |

TABLE V-continued
EFFECT OF LONG CHAIN ALCOHOL AND SODIUM BENZOATE ON TPO

| Run: | s | t | u | v | w | x | y |
|---|---|---|---|---|---|---|---|
| Benzoate | — | — | — | 1 | 1 | 1 | — |
| Stabilizer | 1.25 | 1.25 | 1.25 | 1.25 | 1.25 | 1.25 | 1.25 |
| Paraffinic Oil | 12 | 9 | 4 | 12 | 9 | 4 | 20 |
| Minimum Cycle Time in Sec. | | | | | | | |
| Manual | 30 | 35 | 25 | 40 | 35 | 20 | 30 |
| Sprue Ejection | 150 | 100 | 125 | 60 | 80 | 125 | 150 |
| Physical Properties | | | | | | | |
| Hardness, Shore A | 69 | 71 | 73 | 70 | 72 | 70 | 65 |
| Tensile, psi | 580 | 600 | 600 | 580 | 600 | 600 | 510 |
| 100% Modulus, psi | 470 | 470 | 490 | 480 | 470 | 490 | 410 |
| Elongation, % | 250 | 300 | 280 | 270 | 270 | 290 | 250 |
| Feel | Dry | Dry | Dry | Dry | Dry | Dry | Slightly Tacky |

What is claimed is:

1. A thermoplastic elastomer comprising a blend of:
   (A) a monoolefin copolymer rubber which is a copolymer of ethylene and an alpha-monoolefin of the formula $CH_2=CHR$ where R is an alkyl radical having 1 to 12 carbon atoms, and optionally a copolymerizable diene termonomer;
   (B) a crystalline polyolefin resin;
   (C) a long-chain aliphatic alcohol having at least 16 carbon atoms;
   (D) optionally an amorphous non-elastomeric polypropylene homopolymer or amorphous non-elastomeric copolymer of propylene with another monoolefin; and
   (E) optionally a naphthenic or paraffinic extender oil; the said ingredients being present in the following proportions, expressed as percentages by weight based on the total weight of (A), (B), (C), (D) and (E):
   from 15 to 80% of (A);
   from 15 to 80% of (B);
   from 3 to 40% of (C);
   from 0 to 45% of (D); and
   from 0 to 40% of (E).

2. A thermoplastic elastomer as in claim 1 in an uncured state.

3. A thermoplastic elastomer as in claim 1 in a dynamically partially cured state.

4. A thermoplastic elastomer as in claim 3 in which the quantity of (C) is from 5 to 25%, based on the total weight of (A), (B) (C), (D) and (E).

5. A thermoplastic elastomer as in claim 3 in which the quantity of (C) plus (E) is 8–60%, based on the total weight of (A), (B), (C), (D) and (E).

6. A thermoplastic elastomer as in claim 1 or claim 3 in which (A) is ethylene-propylene-nonconjugated diene terpolymer.

7. A thermoplastic elastomer as in claim 1 or claim 3 in which (B) is polypropylene resin.

8. A thermoplastic elastomer as in claim 1 or claim 3 in which (A) is ethylene-propylene-nonconjugated diene terpolymer and (B) is polypropylene resin.

9. A thermoplastic elastomer as in claim 1 or claim 3 in which (A) is ethylene-propylene-dicyclopentadiene terpolymer and (B) is polypropylene resin.

10. A thermoplastic elastomer as in claim 1 or claim 3 in which (A) is ethylene-propylene-ethylidenenorbornene terpolymer and (B) is polypropylene resin.

* * * * *